(12) United States Patent
Tobias et al.

(10) Patent No.: US 12,111,265 B2
(45) Date of Patent: *Oct. 8, 2024

(54) PROBING FILM THAT ABSORBS AND REACTS WITH GASES, WITH LIGHT OF DIFFERENT WAVELENGTHS FOR HIGHER GAS SENSITIVITY

(71) Applicant: Honeywell International Inc., Morris Plains, NJ (US)

(72) Inventors: Peter Tobias, Minneapolis, MN (US); Christopher Zins, Coon Rapids, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 607 days.

This patent is subject to a terminal disclaimer.

(21) Appl. No.: 16/074,847

(22) PCT Filed: Feb. 10, 2017

(86) PCT No.: PCT/US2017/017288
§ 371 (c)(1),
(2) Date: Aug. 2, 2018

(87) PCT Pub. No.: WO2017/139523
PCT Pub. Date: Aug. 17, 2017

(65) Prior Publication Data
US 2020/0124539 A1 Apr. 23, 2020

Related U.S. Application Data

(60) Provisional application No. 62/294,192, filed on Feb. 11, 2016.

(51) Int. Cl.
*G01N 21/78* (2006.01)

(52) U.S. Cl.
CPC ... *G01N 21/783* (2013.01); *G01N 2201/0484* (2013.01); *G01N 2201/0621* (2013.01); *G01N 2201/0627* (2013.01)

(58) Field of Classification Search
CPC ...... G01N 21/77; G01N 21/783; G01N 21/81; G01N 2201/0484; G01N 2201/0621;
(Continued)

(56) References Cited

U.S. PATENT DOCUMENTS

| 2,800,397 A | 7/1957 | Offutt et al. |
| 3,827,808 A | 8/1974 | Cho |

(Continued)

FOREIGN PATENT DOCUMENTS

| CN | 101416046 A | 4/2009 |
| CN | 102636442 A | 8/2012 |

(Continued)

OTHER PUBLICATIONS

International Application No. PCT/US2017/017361, Written Opinion of the International Searching Authority, mailed May 24, 2017, 7 pages.

(Continued)

*Primary Examiner* — Paul S Hyun
*Assistant Examiner* — Austin Q Le
(74) *Attorney, Agent, or Firm* — Alston & Bird LLP

(57) ABSTRACT

Disclosed herein are methods and systems for distinguishing a nuisance gas from a target gas or group of target gases, which involve a configuration of a light source (120) and paper tape (110) such that light (112) emitted from the light source (120) can reflect off the paper tape (110). The light (112) can emit in at least three wavelengths selected from red, green, blue, and ultra-violet wavelengths, and pattern (Continued)

recognition can be used to identify and/or distinguish the nuisance gas from the target gas or from the group of target gases.

8 Claims, 8 Drawing Sheets

(58) Field of Classification Search
CPC ......... G01N 2201/062; G01N 2201/06; G01N 2201/0612; G01N 2021/3148; G01N 2021/3155; G01N 2021/314; G01N 2021/31
See application file for complete search history.

(56) References Cited

U.S. PATENT DOCUMENTS

| | | | |
|---|---|---|---|
| 4,181,699 | A | 1/1980 | Kitzinger |
| 5,091,642 | A * | 2/1992 | Chow ................. G01N 21/783 250/226 |
| 5,239,175 | A | 8/1993 | Jawad et al. |
| 5,397,538 | A | 3/1995 | Stark et al. |
| 6,406,669 | B1 | 6/2002 | Duan et al. |
| 7,504,958 | B1 | 3/2009 | Genovese et al. |
| 7,996,159 | B2 | 8/2011 | Mottier |
| 8,836,520 | B1 | 9/2014 | Crook |
| 2002/0148948 | A1 | 10/2002 | Hensel |
| 2007/0188425 | A1 | 8/2007 | Saccomanno |
| 2007/0243107 | A1 | 10/2007 | Chase et al. |
| 2008/0259341 | A1 | 10/2008 | Short et al. |
| 2009/0111191 | A1 | 4/2009 | Bonne et al. |
| 2010/0277740 | A1 | 11/2010 | Hulteen et al. |
| 2012/0019815 | A1 | 1/2012 | Horikoshi et al. |
| 2012/0063956 | A1 | 3/2012 | Truex et al. |
| 2012/0202294 | A1 | 8/2012 | Jin |
| 2012/0304729 | A1 * | 12/2012 | O'Dell .................. G01N 21/783 73/1.02 |
| 2013/0010288 | A1 | 1/2013 | Dwyer et al. |
| 2013/0071290 | A1 | 3/2013 | Oum et al. |
| 2013/0186279 | A1 | 7/2013 | Dwyer et al. |
| 2013/0229658 | A1 | 9/2013 | Jouanique-Dubuis et al. |
| 2013/0236980 | A1 * | 9/2013 | Moretti ................ G01N 21/783 436/133 |
| 2013/0259749 | A1 * | 10/2013 | Moretti ................ G01N 21/783 422/85 |
| 2014/0036270 | A1 | 2/2014 | Hulteen et al. |
| 2015/0103346 | A1 | 4/2015 | Erdtmann |
| 2015/0241345 | A1 | 8/2015 | Jin et al. |
| 2015/0362476 | A1 * | 12/2015 | Clements ............... G01N 21/01 506/10 |
| 2015/0367149 | A1 | 12/2015 | Greenawald et al. |
| 2017/0030874 | A1 | 2/2017 | Harrison et al. |
| 2017/0248514 | A1 * | 8/2017 | Pavey ................ G01N 33/0063 |
| 2020/0003697 | A1 | 1/2020 | Nakamura et al. |

FOREIGN PATENT DOCUMENTS

| | | |
|---|---|---|
| CN | 102834711 A | 12/2012 |
| CN | 103189736 A | 7/2013 |
| CN | 203385442 U | 1/2014 |
| CN | 104736989 A | 6/2015 |
| DE | 3526495 A1 | 2/1986 |
| EP | 0477300 A1 | 4/1992 |
| EP | 0733901 A2 | 9/1996 |
| EP | 1043583 A2 | 10/2000 |
| EP | 2487482 A1 | 8/2012 |
| GB | 1100810 A | 1/1968 |
| IN | 31/2007 | 3/2007 |
| JP | H075110 A | 1/1995 |
| JP | 2008241311 A | 10/2008 |
| JP | 5327965 B2 | 10/2013 |
| KR | 10-2012-0000102 A | 1/2012 |
| WO | 9812542 A1 | 3/1998 |
| WO | 2006/016623 A1 | 2/2006 |
| WO | 2010117599 A2 | 10/2010 |
| WO | 2011123403 A1 | 10/2011 |
| WO | 2015/085186 A1 | 6/2015 |
| WO | 2017139523 A1 | 8/2017 |
| WO | 2017139568 A1 | 8/2017 |
| WO | 2017139584 A1 | 8/2017 |

OTHER PUBLICATIONS

International Application No. PCT/US2017/017382, International Preliminary Report on Patentability, mailed Aug. 14. 2018, 8 pages.
International Application No. PCT/US2017/017288, International Preliminary Report on Patentability, mailed Aug. 14. 2018, 8 pages.
International Application No. PCT/US2017/017361, International Preliminary Report on Patentability, mailed Aug. 14. 2018, 8 pages.
U.S. Appl. No. 16/074,868, filed Aug. 2, 2018, 31 pages.
U.S. Appl. No. 16/074,860, filed Aug. 2, 2018, 41 pages.
International Application No. PCT/US2017/017382, International Search Report, mailed May 24, 2017, 4 pages.
International Application No. PCT/US2017/017382, Written Opinion of the International Searching Authority, mailed May 24, 2017, 7 pages.
Xiong et al., "Amperometric Gas detection: A review", International Journal of Electrochemical Science, vol. 9., Sep. 29, 2014, pp. 7152-7181.
Micronas Gas 86xyB—Digital Gas Sensor Platform, Jul. 2013, 8 pages.
International Application No. PCT/US2017/017288, International Search Report, mailed Apr. 24, 2017, 4 pages.
International Application No. PCT/US2017/017288, Written Opinion of the International Searching Authority, mailed May 24, 2017, 7 pages.
International Application No. PCT/US2017/017361, International Search Report, mailed May 24, 2017, 4 pages.
Annex to the communication Mailed on Jun. 30, 2020 for EP Application No. 17707448, 5 pages.
Communication from the Examining Division pursuant to Article 94(c) EPC, mailed on Jun. 30, 2020 for EP Application No. 17707448, 7 pages.
Communication from the Examining Division pursuant to Rules 161(1) and 162 EPC, mailed on Oct. 10, 2018 for EP Application No. 17707449, 3 pages.
Non-Final Office Action received for U.S. Appl. No. 16/074,860, dated Jul. 10, 2020.
Non-Final Rejection Mailed on May 8, 2020 for U.S. Appl. No. 16/074,868.
Advisory Action (PTOL-303) Mailed on Nov. 17, 2020 for U.S. Appl. No. 16/074,868.
Final Rejection Mailed on Sep. 11, 2020 for U.S. Appl. No. 16/074,868.
CN Office Action Mailed on Aug. 28, 2020 for CN Application No. 201780022771.
CN Search report Mailed on Aug. 21, 2020 for CN Application No. 201780022771.
English Translation of CN Office Action Mailed on Aug. 28, 2020 for CN Application No. 201780022771.
English Translation of KR Office Action Mailed on Jan. 29, 2021 for KR Application No. 10-2018-7026216, 2 pages.
KR Office Action Mailed on Jan. 29, 2021 for KR Application No. 10-2018-7026216, 3 pages.
Final Rejection Mailed on Aug. 30, 2021 for U.S. Appl. No. 16/074,860, 39 pages.
Non-Final Office Action Mailed on Aug. 27, 2021, U.S. Appl. No. 16/074,868, 30 pages.
Communication from the Examining Division pursuant to Article 94(3) EPC Mailed on Sep. 22, 2021 for EP Application No. 17707449, 7 pages.
Final Office Action received for U.S. Appl. No. 16/074,868, mailed on Jun. 14, 2021, 26 pages.
Non-Final Rejection Mailed on Feb. 1, 2021 for U.S. Appl. No. 16/074,868.
Non-Final Rejection Mailed on Feb. 12, 2021 for U.S. Appl. No. 16/074,860.

(56) References Cited

OTHER PUBLICATIONS

Decision to grant a European patent Mailed on Nov. 5, 2021 for EP Application No. 17707448, 2 pages.
Communication about intention to grant a European patent received for European Application No. 17707448.1, mailed on Jul. 1, 2021, 6 pages.
Notification of Grant of Patent Right issued in Chinese Application No. 201780022771.2 on May 6, 2021, 1 page.
CN Notice of Allowance Mailed on May 6, 2021 for CN Application No. 201780022771, 2 pages.
English translation of CN Notice of Allowance Mailed on May 6, 2021 for CN Application No. 201780022771, 3 pages.
English translation of KR Notice of Allowance Mailed on Jun. 14, 2021 for KR Application No. 10-2018-7026216, 2 pages.
KR Notice of Allowance Mailed on Jun. 14, 2021 for KR Application No. 10-2018-7026216, 2 pages.
Interview Summary received for U.S. Appl. No. 16/074,860, dated Dec. 2, 2021, 5 pages.
Non-Final Office Action received for U.S. Appl. No. 16/074,860, mailed on Dec. 22, 2021, 17 pages.
Non-Final Office Action received for U.S. Appl. No. 16/074,868, mailed on Jun. 15, 2022, 7 pages.
Final Office Action received for U.S. Appl. No. 16/074,868, mailed on Feb. 22, 2022, 20 pages.
Extended European search report Mailed on Jul. 18, 2022 for EP Application No. 21201238, 8 pages.
Final Office Action received for U.S. Appl. No. 16/074,860, mailed on Aug. 1, 2022, 16 pages.
Advisory Action received for U.S. Appl. No. 16/074,868, mailed on Apr. 29, 2022, 4 pages.
Advisory Action, including Examiner's Nov. 4, 2022 Interview Summary, received for U.S. Appl. No. 16/074,860, dated Nov. 14, 2022.
Examiner's Oct. 26, 2022 Interview Summary received for U.S. Appl. No. 16/074,860, dated Nov. 1, 2022.
Examiner Interview Summary Record (PTOL-413) Mailed on Apr. 20, 2023 for U.S. Appl. No. 16/074,868, 1 page(s).
Non-Final Rejection Mailed on Apr. 26, 2023 for U.S. Appl. No. 16/074,860, 15 page(s).
Notice of Allowance and Fees Due (PTOL-85) Mailed on Apr. 20, 2023 for U.S. Appl. No. 16/074,868, 10 page(s).
CN Office Action, including Search Report Mailed on Jun. 3, 2023 for CN Application No. 202110824200, 9 page(s).
English Translation of CN Office Action dated Jun. 3, 2023 for CN Application No. 202110824200, 1 page(s). Summary only.
Advisory Action (PTOL-303) Mailed on Jan. 25, 2024 for U.S. Appl. No. 16/074,860, 3 page(s).
Final Rejection Mailed on Oct. 17, 2023 for U.S. Appl. No. 16/074,860, 16 page(s).
CN Office Action Mailed on Nov. 10, 2023 for CN Application No. 202110824200, 3 page(s).
English Translation of CN Office Action dated Nov. 10, 2023 for CN Application No. 202110824200, 3 page(s).
Intention to grant Mailed on Nov. 9, 2023 for EP Application No. 17707449, 9 page(s).
Decision to grant a European patent Mailed on Mar. 14, 2024 for EP Application No. 17707449, 2 page(s).
Non-Final Rejection Mailed on Mar. 20, 2024 for U.S. Appl. No. 16/074,860, 16 page(s).
CN Notice of Allowance Mailed on Apr. 21, 2024 for CN Application No. 202110824200, 2 page(s).
English translation of CN Notice of Allowance dated Apr. 21, 2024 for CN Application No. 202110824200, 3 page(s).
Examiner Interview Summary Record (PTOL-413) Mailed on Jun. 25, 2024 for U.S. Appl. No. 16/074,860, 3 page(s).
EP Office Action Mailed on Aug. 16, 2024 for EP Application No. 21201238, 6 page(s).

\* cited by examiner

PROBING FILM THAT ABSORBS AND REACTS WITH GASES, WITH LIGHT OF DIFFERENT WAVELENGTHS FOR HIGHER GAS SENSITIVITY

CROSS-REFERENCE TO RELATED APPLICATIONS

The present application is the National Stage of International Application No. PCT/US2017/017288 filed Feb. 10, 2017 and entitled "Probing Film that Absorbs and Reacts with Gases, with Light of Different Wavelengths for Higher Gas Sensitivity," which claims priority to U.S. Provisional Patent Application No. 62/294,192 filed Feb. 11, 2016, and entitled "Probing Film that Absorbs and Reacts with Gases, with Light of Different Wavelengths, for Higher Gas Sensitivity," such that the present application claims priority to both listed related applications, both of which are incorporated herein by reference as if reproduced in their entirety.

BACKGROUND

Gas detectors can be configured to detect one or more gases for the purpose of monitoring the concentration and/or maintaining a threshold level of one or more gases in an environment. In some instances, gas detectors include a film impregnated with one or more chemicals which react with a gas being detected. The film darkens and/or stains when contacted by the gas being detected. A challenge with these types of gas detectors is the detection of target gases can be confused with the presence of nuisance gases, which can cause false alarms. Thus, there is a need to distinguish target gases from other gases which act as a nuisance in that they are detected and cause false alarm, yet are not of concern for the purpose of detecting the target gas.

SUMMARY

Disclosed herein are methods for distinguishing a nuisance gas from a target gas or group of target gases. For example, the method can comprise contacting a gas stream with a paper tape; emitting at least three wavelengths of light selected from red, green, blue, and ultra-violet wavelengths from a light source; detecting a reflected portion for each of the three wavelengths of light which reflects from the paper tape; and using pattern recognition to identify and/or distinguish the nuisance gas from the target gas or the group of target gases.

Also disclosed herein are systems for distinguishing a nuisance gas from a target gas or group of target gases. For example, the system comprises a paper tape; a light source configured to emit at least three wavelengths of light selected from red, green, blue, or ultra-violet wavelength; a detector configured to detect a reflected portion for each of the three wavelengths of light which reflects from the paper tape; and a processor/controller connected to the detector to: i) receive a digital signal containing detection information for the reflected portion from the detector, ii) use pattern recognition to identify and/or distinguish the nuisance gas from the target gas or the group of target gases.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 shows a 4× standard deviation box for $H_2Se$.

DETAILED DESCRIPTION

Figure 1:
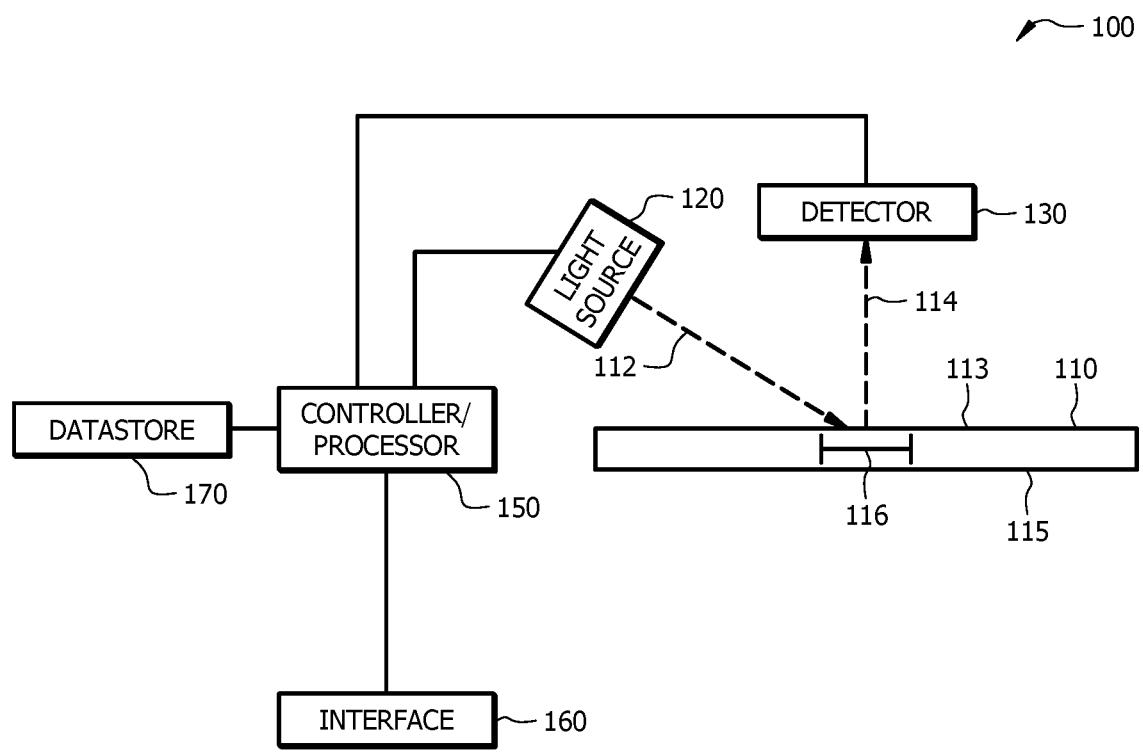
FIG. 1 illustrates a gas detection system in accordance with the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include gas detector configurations and gas detection methods which contact a gas stream with a paper tape, emit a plurality of wavelengths of light from a light source, detect a reflected portion of each of the plurality of wavelengths of the light, and use pattern recognition to identify and/or distinguish a nuisance gas from a target gas. The disclosed embodiments can detect and distinguish amounts of nuisance gases which trigger a false alarm of a gas detector configured to detect one or more target gases. Thus, the disclosed embodiments allow for reducing the number of false alarms due to nuisance gases which are detected in a concentration above a threshold limit value (TLV) for a target gas and mistaken by prior gas detection systems for the target gas.

"Nuisance gas" is defined as a gas which is detectable by the gas detector embodiments disclosed herein and which has a higher threshold limit value (TLV) than a threshold limit value for a target gas or a group of target gases that is not the nuisance gas, thus causing a false alarm in prior art gas detection systems for the target gas or group of target gases when the nuisance gas is present in a concentration above the TLV of the target gas or lowest TLV of a group of target gases.

In embodiments, the gas stream can be any gas such as oxygen, nitrogen, or a combination of oxygen and nitrogen (e.g., air).

In embodiments, a target gas in the gas stream can be one or more of hydrogen sulfide ($H_2S$), hydrogen selenide ($H_2Se$), diborane ($B_2H_6$), germane ($GeH_4$), silane ($SiH_4$), phosphine ($PH_3$), arsine ($AsH_3$), ammonia ($NH_3$), or a combination thereof.

In an embodiment, the nuisance gas can be $H_2S$, which is distinguishable using the embodiments disclosed herein from hydrides which include $H_2Se$, $B_2H_6$, $GeH_4$, $SiH_4$, $PH_3$, $AsH_3$, $NH_3$, or a combination thereof (a group of hydrides). For example, the TLV of $H_2S$ is 1,000 ppb which is higher than the TLV of $B_2H_6$ (TLV=100 ppb) and $AsH_3$ (TLV=5 ppb). Thus, a concentration of 150 ppb $H_2S$ in a gas stream, which is below the TLV for $H_2S$, can trigger a false alarm for a detector set to detect a TLV of 5 ppb $AsH_3$ and/or 100 ppb $B_2H_6$, where the detector cannot distinguish between stains in a paper tape created by $H_2S$ and stains created by $AsH_3$ and $B_2H_6$. However, the disclosed embodiments can distinguish $H_2S$ from other hydrides such as $B_2H_6$ and $AsH_3$ so as to prevent a false alarm in the above scenario where the concentration of $H_2S$ is detected to be 150 ppb.

In another embodiment, the nuisance gas can be $NO_2$, which is distinguishable using the embodiments disclosed herein from $Cl_2$, $F_2$, $ClO_2$, or a combination thereof. For example, the TLV of $NO_2$ is 200 ppb which is higher than the TLV of $ClO_2$ (TLV=100 ppb). Thus, a concentration of 150 ppb $NO_2$, which is below the TLV for $NO_2$, can trigger a false alarm for a detector set to detect a TLV of 100 ppb $ClO_2$, where the detector cannot distinguish between stains in a paper tape created by $NO_2$ from stains created by $ClO_2$. However, the disclosed embodiments can distinguish $NO_2$ from $ClO_2$ so as to prevent a false alarm in the above scenario where the concentration of $NO_2$ is detected to be 150 ppb.

Referring now to FIG. 1, an embodiment of a gas detection system 100 according to the disclosure is shown. The system 100 may be referred to as a toxic gas analyzer cassette. The system 100 includes a paper tape 110, a light source 120 configured to emit light 112, and a detector 130 configured to detect at least some of the reflected portion 114 of light 112 which reflects from the paper tape 110. As can be seen in FIG. 1, the system 100 may further optionally include a controller/processor 150 and an interface 160. The controller/processor 150 may be connected to the light source 120, the detector 130, the interface 160 or a combination thereof.

The paper tape 110 is a chemically treated paper that reacts with a target gas which comes into contact with the paper tape 110 via flow of gas stream containing the target gas over the paper tape 110, through the paper tape 110, or both over and through the paper tape 110. The chemical treatment may be an impregnation of the paper tape with one or more chemicals. The paper tape 110 may also be referred to as an absorber film, a hydride tape, or an oxidizer tape. In embodiments, flow of the gas stream is focused to a region 116 of the paper tape 110. The paper tape 110 reacts with a target gas when contacted with the target gas, and the reaction forms a stain on the paper tape 110 (the stain being the reaction product produced by contact of the target gas with the paper tape 110). The stain produced by contact of the target gas with the paper tape 110 can be a color depending on the target gas and the chemical used to chemically treat the paper to yield the paper tape 110. For example, $PH_3$ produces a rust-colored stain, $AsH_3$ produces a gray-colored or black-colored stain, and toluene-di-isocyanate produces a brown-colored or black-colored stain. Moreover, the stain can have a particular strength, e.g., light, medium, or dark. A particular paper tape 110 may yield stains for one or more target gases while not yielding stains for other gases, depending on the chemical treatment. An unstained paper tape 110 can be referred to as being in a "white" state. Staining of the paper tape 110 generally transforms the paper tape 110 from a white state to a stained state, indicating the presence of one or more target gases in the gas stream. Reference to a "white" paper tape 110 generally refers to the paper tape 110 before contact with any target gas, regardless of the color of paper tape 110 (e.g., the paper tape 110 can have a yellowish hue instead of being bright white).

Embodiments of the light source 120 generally include any device which can emit more than one wavelength of light. In one embodiment, the light source 120 emits light which includes wavelengths corresponding to two or more of red, green, blue, and ultra-violet. In another embodiment, the light source 120 is a broadband light source which emits multiple wavelengths of light.

The light source 120 can be in the form of LEDs. The one or more LEDs may be selected from i) one or more broadband LED which emits a combination of wavelengths of light (e.g., a combination of red, green, and blue (RGB) wavelengths of light), or ii) multiple LEDs, each of which emits a single wavelength of light (e.g., each LED emits one of green, red, blue, or ultra-violet).

Examples of LEDs which emit red, green, and blue wavelengths of light are a RGB-LED from Thorlabs® (part number LEDRGBE) and a SMD-LED from Bivar (part number SMP4-RBG).

The system 100 is configured such that the light emitted from the light source 120 travels to or is directed to (e.g., via a light pipe) a region 116 of the paper tape 110 for reflection from the side 113 of the paper tape 110.

The detector 130 is any photodetector device known in the art for detecting one or more wavelengths of the light 112 which reflects from the paper tape 110. The detector 130 is positioned on the side 113 of the paper tape 110 so that the detector 130 can detect the reflected portion 114 of light 112 which reflects from the paper tape 110 and reaches the detector 130. The detector 130 may output signals that indicate intensity (e.g., the amount of light) and/or color (e.g., wavelength of the light) of the portion 114 of light 112. The detector 130 may be connected to a controller/processor 150, which may provide further analysis of the detected portion 114 of light 112.

In embodiments where the light source 120 is a broadband light source, the detector 130 can be a multi-wavelength detector. In such embodiments, the paper tape 110 can be illuminated with white light and the spectral distribution of the reflected portion 114 can be detected and analyzed, where the fluorescing light is counted for the wavelength where the light fluoresces. In embodiments where the light source 120 emits specific wavelengths of light (e.g., red, green, blue, UV, or a combination thereof), the detector 130 is configured to detect the specific wavelengths. In such embodiments, a count is made for whichever specific wavelength was activated in the light source 120.

The controller/processor 150 can provide further analysis of detected reflected portion 114 of light 112. The controller/processor 150 may also control parameters of the light source 120, for example, whether and when the light source 120 turns on and off, the intensity (e.g., the amount of light) of the light source 120, which portions(s) (e.g., which wavelength(s)) of the light source 120 are active or inactive, or a combination thereof.

An interface 160 can be connected to the controller/processor 150. In an embodiment, the interface 160 is a MM-interface.

In operation, a gas stream containing one or more gases contacts the paper tape 110 by being directed over or through the paper tape 110, e.g., over or through at least the region 116 of the paper tape 110. The direction of flow of the gas stream can be any direction which allows for contact of any target gases with region 116 of the paper tape 110. Directions of flow include flow on the side 113 of the paper tape 110 and perpendicular to the potion 114 of light 112 (from right to left or from left to right as looking at FIG. 1), flow at any angle (including zero) with respect to the portion 114 of light 112 and through the paper tape 110 from the side 113 to the opposite side 115 with subsequent flow away from the opposite side 115 at any angle with respect to the paper tape 110, or a combination thereof.

At least one target gas in the one or more gases of the gas stream can react with the paper tape 110 and lead to a darkening or staining of the paper tape 110.

The controller/processor 150 controls the light source 120 so as to activate the light source according to the techniques disclosed herein. Generally, the controller/processor 150 controls the color (i.e., wavelength) and intensity (e.g., amount) of light 112 emitted from the light source 120. For example, the light source 120 can be activated (e.g., flashed) in light pulses of 1, 2, 3, 4, 5, 6, 7, 8, 9, 10, or more ms. During each activation or flash, the light source 120 flashes the wavelength of a single color (e.g., red, green, blue, or UV). The light source 120 may be activated any number of times for any order of the wavelengths.

Generally, the light 112 (e.g., whichever wavelength is activated for the particular light pulse) emitted from the light source 120 is directed to the paper tape 110 (e.g., to a particular region 116 of the paper tape 110) by facing the light source 120 to the side 113 of the paper tape 110 or by using a light pipe to direct the light to the side 113 of the paper tape 110. A portion 114 of the light 112 reflects from the side 113 of the paper tape 110, and the detector 130 detects the reflected portion 114 of the light 112 emitted from the light source 120.

The detector 130 communicates with the controller/processor 150 regarding the detected portion 114 of light 112. Generally, the detector 130 converts the detected light signal to a digital signal which is communicated to the controller/processor 150. The controller/processor 150 is configured to correlate the detection information received in the digital signal from the detector 130 with the corresponding wavelength information for light 112 emitted from the light source 120. The controller/processor 150 can be operably connected with a datastore 170 for storing and/or aiding in the processing of the detection information and/or wavelength information.

For each light pulse of each wavelength of light emitted from the light source 120 and detected by the detector 130, the controller/processor 150 calculates an adjusted count (herein "AC"), defined by the following equation (1):

$$AC=[S(0)/S(t)]-1 \qquad (1)$$

wherein S(0) is the original intensity of the light 112 emitted from the light source 120 at time zero and S(t) is the actual intensity of the reflected portion 114 of the light 112 which is detected by the detector 130 at time, t, which is greater than 0. It is contemplated that multiple ACs for each wavelength can be calculated from multiple light pulses of the wavelength to further obtain an average adjusted count of the wavelength for a specified period of total time, e.g., every 1, 2, 3, 4, 5, 6, 7, 8, 9, 10 or more seconds.

Pattern recognition techniques are used to determine characteristics or color patterns of the stains on the paper tape 110 to identify and distinguish a nuisance gas from a target gas or a group of target gases which can also cause stains in the paper tape 110. Suitable pattern recognition techniques include any such techniques known in the art. A pattern recognition technique contemplated by this disclosure includes calculating a characteristic or color pattern for the reflected portion 114 of light 112 for different wavelengths of light 112 by relating the stains measured at different light wavelengths to one another and assigning some characteristic or color pattern to one group of gases or particles and other characteristics or color patterns to another group of gases.

Exemplary techniques are discussed based on the AC of red, green, blue, UV, or a combination thereof, such as the techniques used in Examples 2 to 13 below. The below Examples show the techniques can be used to determine that gases can be distinguished. Because it was determined that gases are indeed distinguishable using pattern recognition techniques, pattern recognition techniques can be used for gas streams flowing through the embodiments of the system 100 of FIG. 1 in order to identify the characteristic or color pattern generated by reflection of light 112 from a stain on the paper tape 110. Subsequently, the calculated characteristic or color pattern can be matched to a previously-recorded (e.g., in a datastore 170 operably connected with the controller/processor 150) characteristic or color pattern to determine the identity of the gas making the stain to determine whether the identity of the gas is a nuisance gas which does not warrant an alarm or a target gas which warrants an alarm. For example, the calculated characteristic or color pattern can be compared with the characteristic or color pattern of a nuisance gas, and in absence of a match, it is determined that the identity of the gas is not the nuisance gas and an alarm is warranted; the calculated characteristic or color pattern can be compared with the characteristic or color pattern of a nuisance gas, and in existence of a match, it is determined that the identity of the gas is the nuisance gas and an alarm is not warranted; the calculated characteristic or color pattern can be compared with the characteristic or color pattern of a target gas or group of target gases, and in absence of a match, it is determined that the identity of the gas is the nuisance gas and an alarm is not warranted; the calculated characteristic or color pattern can be compared with the characteristic or color pattern of a target gas or group of target gases, and in existence of a match, it is determined that the identity of the gas is not the nuisance gas and an alarm is warranted; or a combination thereof.

Pattern recognition techniques can include generation of a reference level to which subsequent data is compared. For example, each wavelength of light 112 (red, green, blue, UV) in the light source 120 can be individually flashed for a fresh paper tape (e.g., a fresh region of a paper tape) before exposing the paper tape to a gas stream. The pattern recognition technique can be used to record the reference level (e.g., of color, intensity, or both color and intensity). The controller/processor 150 can subsequently use the reference level when performing the pattern recognition technique on a stain of the paper tape to identify the stain and to distinguish any nuisance gas from a target gas or group of target gases.

It is contemplated that the system 100 shown in FIG. 1 can include all the components manufactured on a common circuit board which has circuitry appropriate for connecting components 120, 130, 150, and optionally 160, in an order and arrangement. In an alternative embodiment, wiring which is not embedded in the circuit board can connect the controller/processor 150 to the interface 160. The circuit board and the paper tape 110 can be held in place by a housing of a physical detection unit. The housing can be made of any material and of any configuration suitable for holding the components for gas detection. Additionally, manufacture of the system 100 of FIG. 1 can also include a light pipe which directs the light 112 emitted from the light source 120 to the detector 130. Similar to the housing, the light pipe can be made of material and manufactured according to techniques known in the art.

In combination with any of the embodiments disclosed herein, other light source and optionally other detectors can be used for traditional gas detection techniques. In such embodiments, the controller/processor 150 is operable to control both the light source 120, detector 130, any additional light source, and any additional detector, such that all components operate in cooperation. For example, the traditional light source may operate using about ten short light pulses per second, with each short light pulse having a duration in a range of 1 ms to 10 ms. The time between the short light pulses of the traditional light source, referred to herein as "dark time," can be used to operate the light source 120 for emission and reflection of light 112 as described for FIG. 1.

The above described systems and methods can include the following embodiments.

Embodiment 1 which is a method for distinguishing a nuisance gas from a target gas or group of target gases, the method comprising: contacting a gas stream with a paper tape (110); emitting at least three wavelengths of light (112) selected from red, green, blue, and ultra-violet wavelengths from a light source (120); detecting a reflected portion (114) for each of the at least three wavelengths of light (112) which reflects from the paper tape (110); and using pattern recognition to identify and/or distinguish the nuisance gas from the target gas or from the group of target gases.

Embodiment 2 can include embodiment 1, wherein the step of using pattern recognition comprises: using a pattern recognition technique to determine the characteristic or color pattern of the reflected portion (114) for each of the at least three wavelengths which is detected; matching the characteristic or color pattern with a previously recorded characteristic or previously recorded color pattern; and identifying the characteristic or color pattern as belonging to the nuisance gas, the target gas, or the group of target gases.

Embodiment 3 can include any of embodiments 1 to 2, wherein the at least three wavelengths of light are i) red, green, and blue, ii) ultra-violet, red, and green, iii) ultra-violet, green, and blue, or iv) ultra-violet, red, and blue.

Embodiment 4 can include any of embodiments 1 to 3, wherein the at least three wavelengths are emitted as separate light pulses.

Embodiment 5 can include embodiment 4, wherein each of the light pulses has a duration of at least 1 millisecond (ms).

Embodiment 6 can include any of embodiments 1 to 5, further comprising: controlling an intensity of the light (112) emitted from the light source (120).

Embodiment 7 can include any of embodiments 4 to 6, further comprising: calculating, for each of the light pulses of each wavelength of light (112) emitted from the light source (120), an adjusted count defined by the following equation: $AC=[S(0)/S(t)]-1$, wherein $S(0)$ is an original intensity of the light (112) emitted from the light source 120 at time zero and $S(t)$ is an actual intensity of the reflected portion (114) of the light (112) which is detected at time, t, which is greater than 0.

Embodiment 8 can include any of embodiments 1 to 7, wherein the pattern recognition uses a ratio of adjusted counts (AC) for red wavelength to AC for green wavelength versus a ratio of AC for blue wavelength to AC for green wavelength, for i) the nuisance gas, ii) the target gas, iii) each gas in the group of target gases, or a combination thereof.

Embodiment 9 can include any of embodiments 1 to 8, wherein the pattern recognition uses a ratio of AC for red wavelength to the AC for green wavelength versus a ratio of AC for UV wavelength to the AC for green wavelength, for i) the nuisance gas, ii) the target gas, iii) each gas in the group of target gases, or a combination thereof.

Embodiment 10 can include any of embodiments 1 to 9, wherein the light source (120) includes a UV+GB-LED, a UV+RG-LED, a RGB-LED, or a combination thereof.

Embodiment 11 can include any of embodiments 1 to 10, wherein the step of using pattern recognition is performed without using humidity data.

Embodiment 12. A system for distinguishing a nuisance gas from a target gas or group of target gases, the system comprising: a paper tape (110); a light source (120) configured to emit at least three wavelengths of light (112) selected from red, green, blue, or ultra-violet wavelength; a detector (130) configured to detect a reflected portion (114) for each of the three wavelengths of light (112) which reflects from the paper tape (110); and a processor/controller (150) connected to the detector (130) to: i) receive a digital signal containing detection information for the reflected portion (114) from the detector (130), and ii) use pattern recognition to identify and/or distinguish the nuisance gas from the target gas or the group of target gases.

Embodiment 13 can include embodiment 12, further comprising: a datastore (170) operably connected to the processor/controller (150) to record characteristics, color patterns, or both characteristics and color patterns generated by the processor/controller (150).

Embodiment 14 can include any of embodiments 12 to 13, wherein in order to use pattern recognition, the processor/controller (150) is configured to: a) use a pattern recognition technique to determine the characteristic or color pattern of the reflected portion (114) for each of the three wavelengths which is detected; b) match the characteristic or color pattern with a previously recorded characteristic or previously recorded color pattern; and c) identify the characteristic or color pattern as belonging to the nuisance gas, the target gas, or the group of target gases.

Embodiment 15 can include any of embodiments 12 to 14, wherein the three wavelengths are emitted as separate light pulses.

Embodiment 16 can include embodiment 15, wherein each of the light pulses has a duration of at least 1 millisecond (ms).

Embodiment 17 can include any of embodiments 15 to 16, wherein the processor/controller (150) is further configured to calculate, for each of the light pulses of each wavelength of light (112) emitted from the light source (120), an adjusted count defined by the following equation: AC=[S(0)/S(t)]−1, wherein S(0) is an original intensity of the light (112) emitted from the light source 120 at time zero and S(t) is an actual intensity of the reflected portion (114) of the light (112) which is detected at time, t, which is greater than 0.

Embodiment 18 can include any of embodiments 12 to 17, wherein the processor/controller (150) is further configured to: control an intensity of the light (112) emitted from the light source (120).

Embodiment 19 can include any of embodiments 12 to 18, wherein the at least three wavelengths of light (112) are i) red, green, and blue, ii) ultra-violet, red, and green, iii) ultra-violet, green, and blue, or iv) ultra-violet, red, and blue.

Embodiment 20 can include any of embodiments 12 to 19, wherein the controller/processor (150) does not use humidity data to identify and/or distinguish the nuisance gas from the target gas or the group of target gases.

Embodiment 21 can include any of embodiments 12 to 20, wherein the pattern recognition uses a ratio of adjusted counts (AC) for red wavelength to AC for green wavelength versus a ratio of AC for blue wavelength to AC for green wavelength, for i) the nuisance gas, ii) the target gas, iii) each gas in the group of target gases, or a combination thereof.

Embodiment 22 can include any of embodiments 12 to 21, wherein the pattern recognition uses a ratio of AC for red wavelength to the AC for green wavelength versus a ratio of AC for UV wavelength to the AC for green wavelength, for i) the nuisance gas, ii) the target gas, iii) each gas in the group of target gases, or a combination thereof.

Embodiment 23 can include any of embodiments 12 to 22, wherein the light source (120) includes a UV+GB-LED, a UV+RG-LED, a RGB-LED, or a combination thereof.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner.

Examples 1 to 13 utilized a system comparable to the system 100 of FIG. 1.

Figure 2:
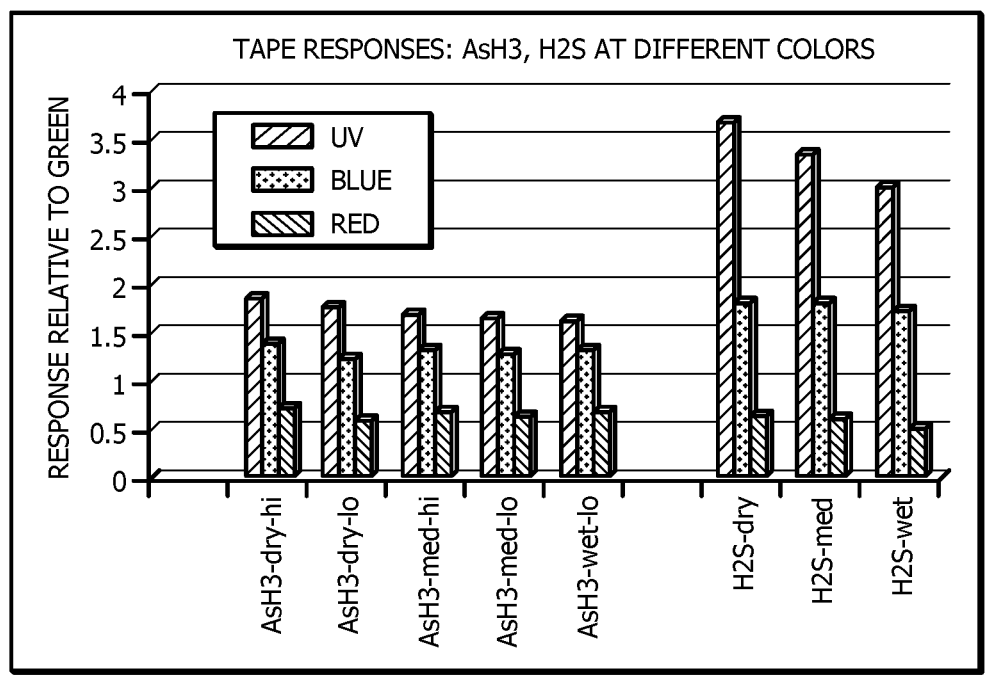
FIG. 2 is a graph of the response of a paper tape configured to detect arsine ($AsH_3$) for $AsH_3$ and one of the nuisance gases, hydrogen sulfide ($H_2S$). The response of UV, blue, and red wavelengths relative to the green wavelength response are shown at different humidities.

Example 1 determined the response of a paper tape configured to detect arsine ($AsH_3$) for $AsH_3$ and one of the nuisance gases, hydrogen sulfide ($H_2S$). The wavelengths used were red, green, blue, and UV. The response of UV, blue, and red wavelengths relative to the green wavelength response are shown in FIG. 2. The terms in the x-axis of "dry," "med," and "wet" indicate the relative humidity of the sample tested, and the terms "hi" and "low" indicate concentration of $AsH_3$ in the sample. As can be seen, the response of $AsH_3$ to UV, blue, and red wavelengths relative to the green wavelength is distinguishable when compared with the response of $H_2S$ to UV, blue, and red wavelengths relative to the green wavelength, for different concentrations of $AsH_3$ and for different humidity levels for both $AsH_3$ and $H_2S$.

Figure 3:
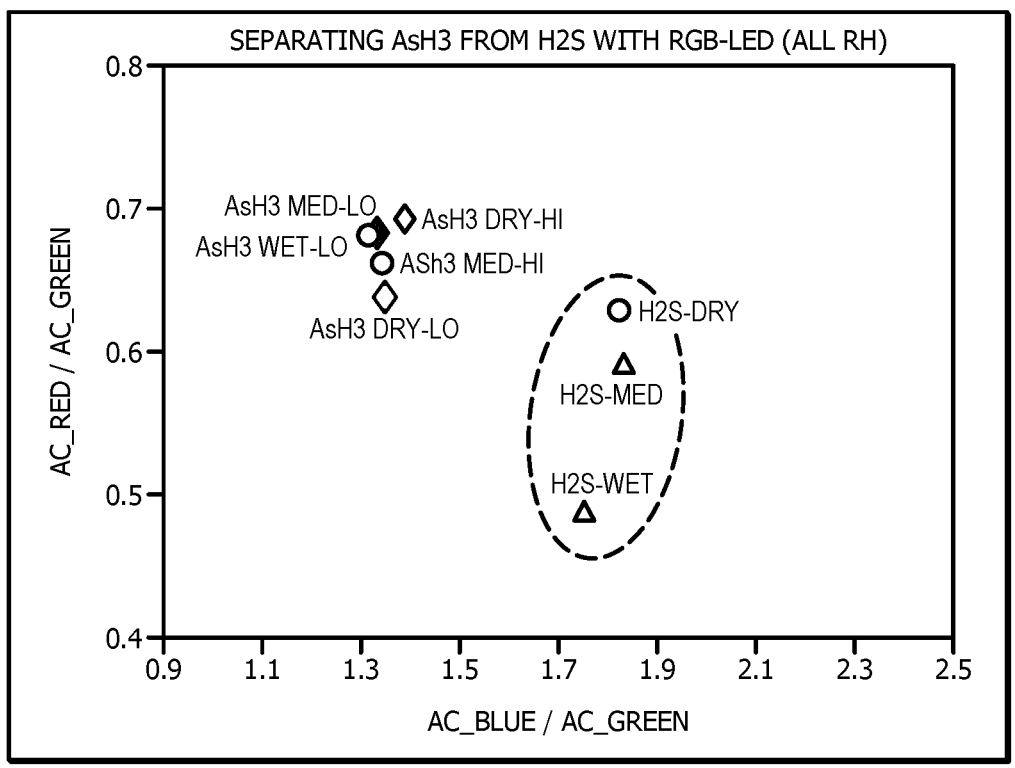
FIG. 3 is a graph of the ratio of adjusted counts (AC) for red wavelength to the AC for green wavelength versus the ratio of AC for blue wavelength to the AC for green wavelength, for each of $AsH_3$ and $H_2S$ using a RGB-LED.

Example 2 was conducted to demonstrate a pattern recognition technique for distinguishing between $AsH_3$ (the target gas) and $H_2S$ (the nuisance gas) using a RGB-LED as the light source. The pattern recognition technique in Example 2 involved calculating a first ratio of adjusted counts (AC) for red wavelength to the AC for green wavelength, calculating a second ratio of AC for blue wavelength to the AC for green wavelength, and comparing the first ratio and second ratio to determine any differences between $AsH_3$ and $H_2S$. The results of Example 2 are shown in FIG. 3. The terms "dry," "med," and "wet" indicate the relative humidity of the gas stream tested, and the terms "hi" and "low" indicate concentration of $AsH_3$ in the tested gas stream. As can be seen, using the pattern recognition technique of Example 2 for a RGB-LED light source, stains of $H_2S$ can be distinguished from stains of $AsH_3$ across a range of humidity and a range of concentration of $AsH_3$ in the gas stream. Moreover, Example 2 demonstrates $AsH_3$ and $H_2S$ are distinguishable regardless of humidity, suggesting a relative humidity sensor may not be needed when distinguishing at least some nuisance gases from some target gases, e.g., distinguishing $H_2S$ from $AsH_3$ when using a RGB-LED as the light source.

Figure 4:
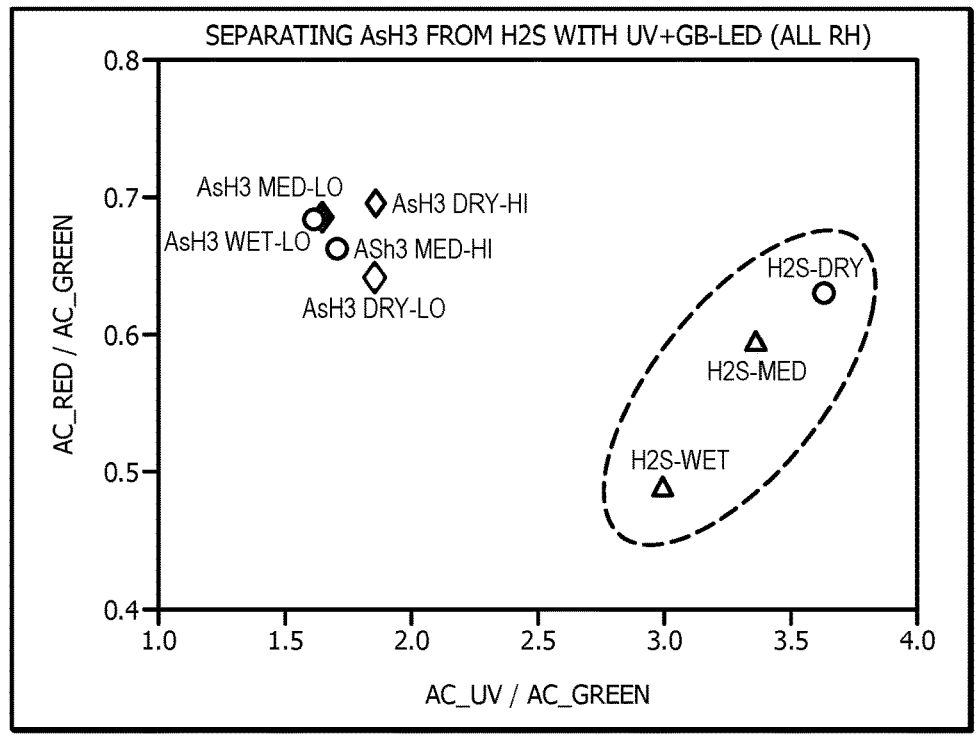
FIG. 4 is a graph of the ratio of AC for red wavelength to the AC for green wavelength versus the ratio of AC for UV wavelength to the AC for green wavelength, for each of $AsH_3$ and $H_2S$ using a UV+GB-LED.

Example 3 was conducted to demonstrate a pattern recognition technique for distinguishing between $AsH_3$ (the target gas) and $H_2S$ (the nuisance gas) using an UV+GB-LED as the light source. The pattern recognition technique in Example 3 involved calculating a first ratio of adjusted counts (AC) for red wavelength to the AC for green wavelength, calculating a second ratio of AC for UV wavelength to the AC for green wavelength, and comparing the first ratio and second ratio to determine any differences between $AsH_3$ and $H_2S$. The results of Example 3 are shown in FIG. 4. The terms "dry," "med," and "wet" indicate the relative humidity of the gas stream tested, and the terms "hi" and "low" indicate concentration of $AsH_3$ in the tested gas stream. As can be seen, using the pattern recognition technique of Example 3 for a UV+GB-LED light source, stains of $H_2S$ can be distinguished from stains of $AsH_3$ across a range of humidity and a range of concentration of $AsH_3$ in the gas stream. Moreover, Example 3 demonstrates $AsH_3$ and $H_2S$ are distinguishable regardless of humidity, suggesting a relative humidity sensor may not be needed when distinguishing at least some nuisance gases from some target gases, e.g., distinguishing $H_2S$ from $AsH_3$ when using a UV+GB-LED as the light source.

Figure 5:
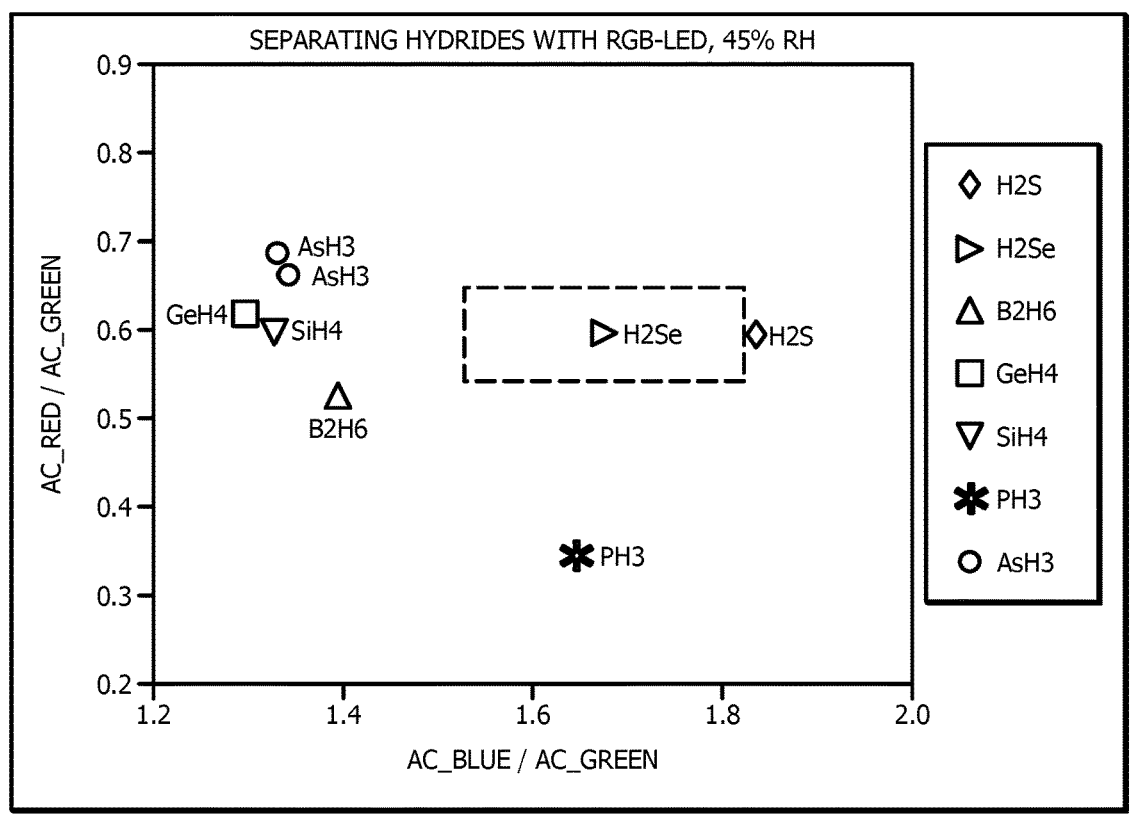
FIG. 5 is a graph of the ratio of AC for red wavelength to the AC for green wavelength versus the ratio of AC for blue wavelength to the AC for green wavelength, for selected gases at 45% relative humidity using a RGB-LED.
Figure 6:
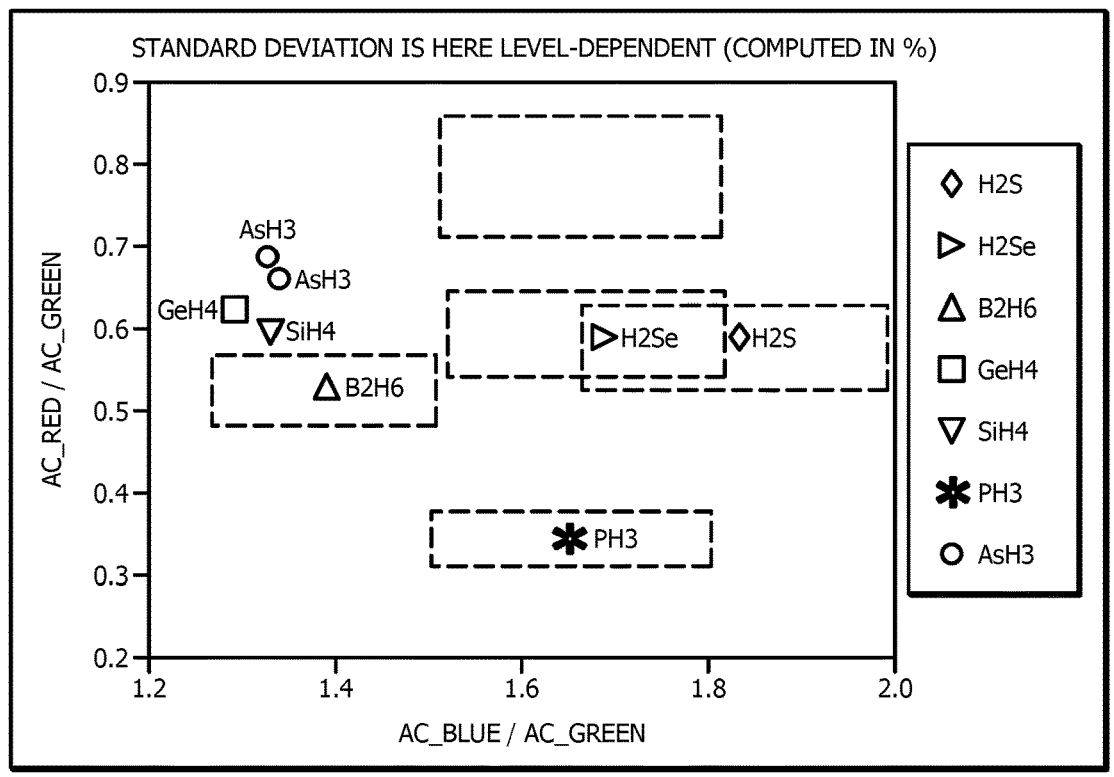
FIG. 6 shows the same graph as FIG. 5, with a 4× standard deviation box for $H_2Se$, as well as 4× standard deviation boxes for $H_2S$, $B_2H_6$, and $PH_3$.

Examples 4 and 5 were conducted to demonstrate the pattern recognition technique used for Example 2 can be used to distinguish the nuisance gas $H_2S$ from a group of hydride gases, namely, $H_2Se$, $B_2H_6$, $GeH_4$, $SiH_4$, $PH_3$, and $AsH_3$. The results of Examples 4 and 5 are shown in FIGS. 5 and 6, respectively. In the pattern recognition technique shown in FIGS. 5 and 6, the value for AC for green wavelength was 100. The systems used to generate the data of FIGS. 5 and 6 utilized a RGB-LED for the light source. The samples had a relative humidity of 45%. The difference between FIG. 5 and FIG. 6 is FIG. 5 shows a 4× standard deviation box for $H_2Se$ and FIG. 6 shows 4× standard deviation boxes for $H_2Se$ as well as $H_2S$, $B_2H_6$, and $PH_3$. The calculated standard deviation is shown in FIGS. 5 and 6 as computed in %, and the measurement thereof originates from 1) variability of the spots on the same paper tape, 2) varying gas concentrations (measurements were consecutive and not in parallel), and 3) other inherent variabilities of the circuits and paper tape. The standard deviation calculation does not include variability among the paper tapes used or any aging effects (only fresh tapes were used). As can be seen, the values for $H_2S$ in the plots of FIGS. 5 and 6 are distinguishable from the other hydrides tested, without taking standard deviation into account. However, when standard deviation calculated as described is taken into account, $H_2S$ is not distinguishable from $H_2Se$.

Examples 6 and 7 were conducted to demonstrate the pattern recognition technique used for Examples 4 and 5 can be used to distinguish the nuisance gas $H_2S$ from a group of hydride gases, namely, $H_2Se$, $B_2H_6$, $GeH_4$, $SiH_4$, $PH_3$, and $AsH_3$—at different intensities of the wavelengths of light, for different light sources, and at constant relative humidity. The pattern recognition technique of Example 2 was used in Example 6, and the pattern recognition technique of Example 3 was used in Example 7. The system used to generate the data of FIG. 7 utilized a RGB-LED for the light source. The system used to generate the data of FIG. 8 utilized an UV+RG-LED for the light source. The gas streams tested all had a relative humidity of 45%. The same 4×standard deviation used for Examples 4 and 5 was calculated for Examples 6 and 7.

Figure 7:
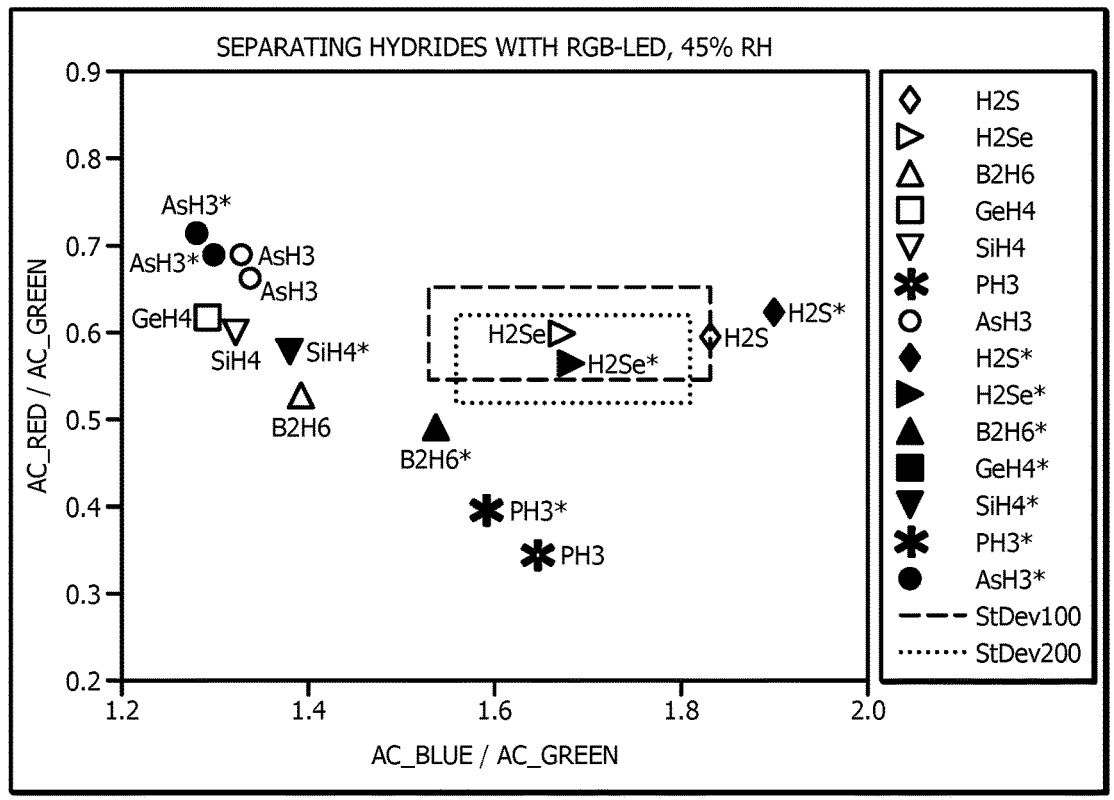
FIG. 7 is a graph of the ratio of AC for red wavelength to the AC for green wavelength versus the ratio of AC for blue wavelength to the AC for green wavelength, for selected gases using a RGB-LED at 45% relative humidity.
Figure 8:
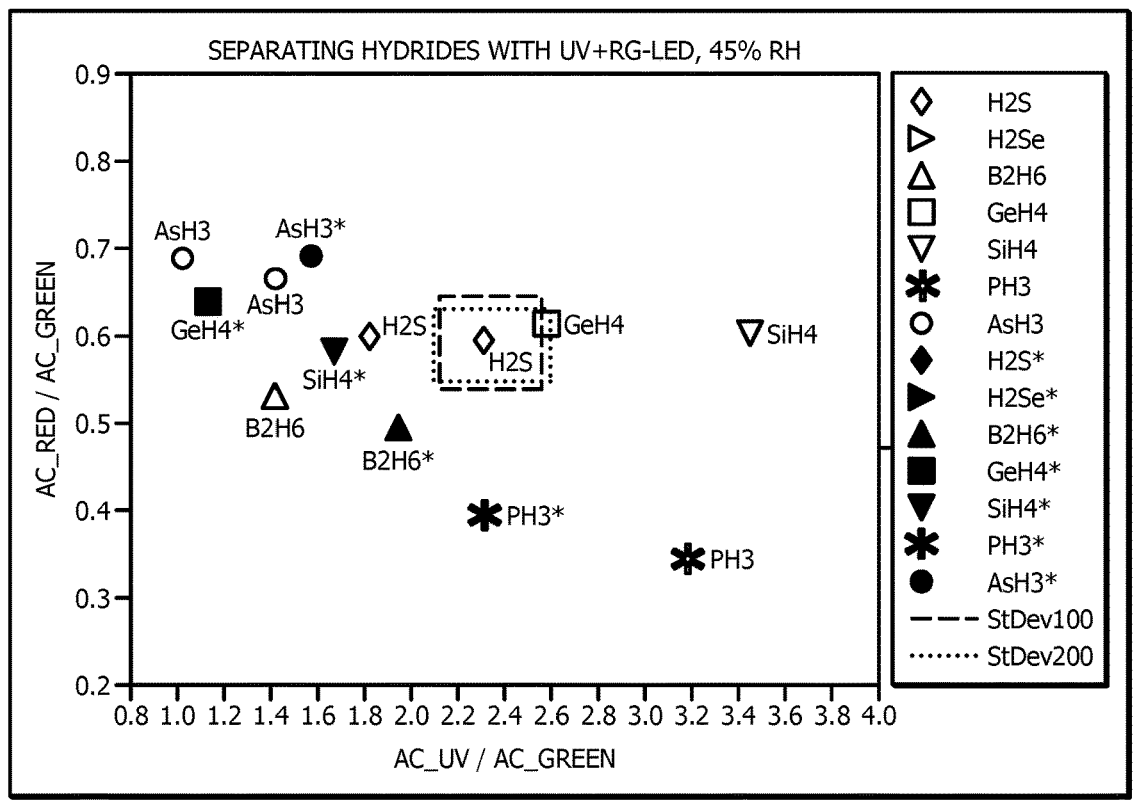
FIG. 8 is a graph of the ratio of AC for red wavelength to the AC for green wavelength versus the ratio of AC for UV wavelength to the AC for green wavelength, for selected gases using a UV+RG-LED at 45% relative humidity.

The results of Examples 6 and 7 are shown in FIGS. 7 and 8, respectively. In the pattern recognition techniques shown in FIGS. 7 and 8, intensities for green wavelength were varied such that AC for green wavelength was 100 (indicated with the "*") and 200 (indicated with "*" used in the labeling of the gases) for each of the gases tested. AC of 100 for the green wavelength is referred to as green AC=100 below, and AC of 200 for the green wavelength is referred to as green AC=200 below.

Without taking into account standard deviation, the values for $H_2S$ in the plots of FIGS. 7 and 8 are distinguishable from the other hydrides tested for both intensities of green wavelength used. However, when standard deviation calculated is taken into account in FIG. 7, the $H_2S$ value for green AC=100 is not distinguishable from either of the $H_2Se$ values for both green AC=100 and green AC=200. When the standard deviation calculated is taken into account in FIG. 8, the $H_2S$ value for green AC=100 may have problems distinguishing from $GeH_4$, but is otherwise distinguishable from the other hydrides. The large values for the ratio of red wavelength AC to green wavelength AC, for each of GeH4, SiH4, and PH3at green AC=100 (which may cause problems distinguishing $H_2S$ from $GeH_4$ under the conditions in Example 7), is surprising, since lower values such as those for each of GeH4, SiH4, and PH3at green AC=200 were expected.

In FIG. 8, $H_2S$ and $H_2Se$ have no UV signal at the green wavelength of intensity which results in an AC green wavelength value of 200 due to malfunctioning of the testing system (i.e., the tape advanced too early).

Figure 9:
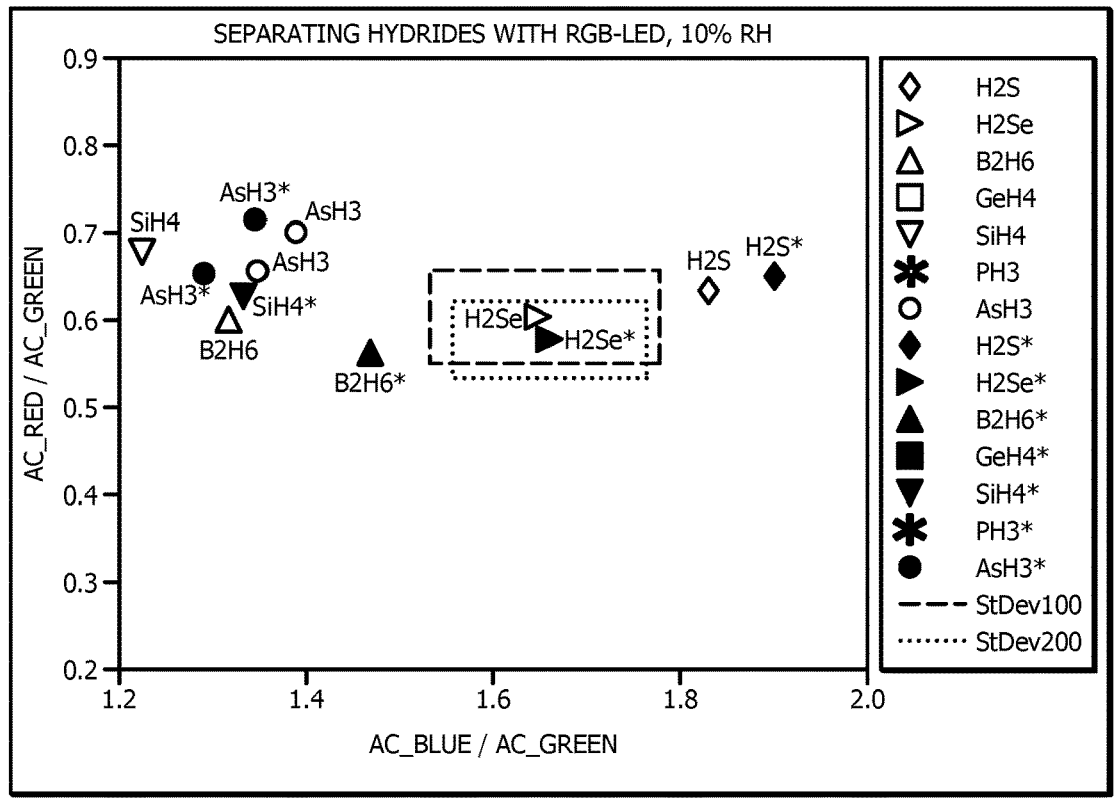
FIG. 9 is a graph of the ratio of AC for red wavelength to the AC for green wavelength versus the ratio of AC for blue wavelength to the AC for green wavelength, for selected gases using a RGB-LED at 10% relative humidity.
Figure 10:
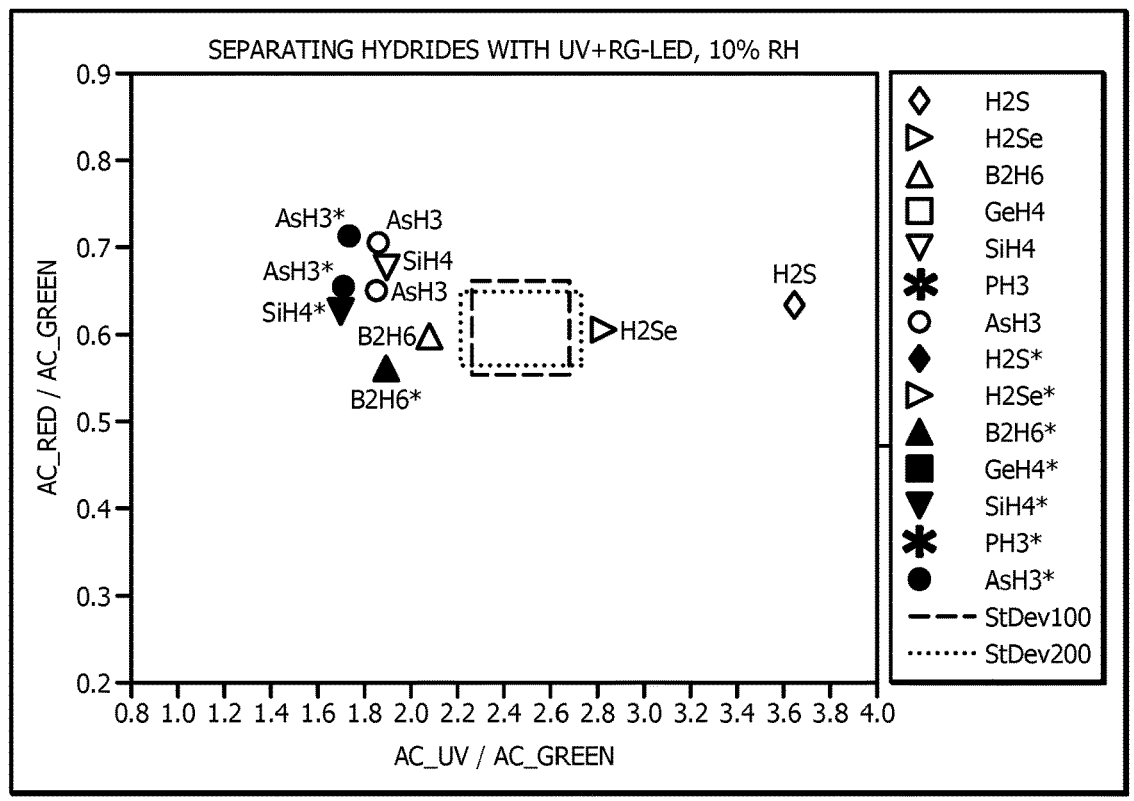
FIG. 10 is a graph of the ratio of AC for red wavelength to the AC for green wavelength versus the ratio of AC for UV wavelength to the AC for green wavelength, for selected gases using a UV+RG-LED at 10% relative humidity.
Figure 11:
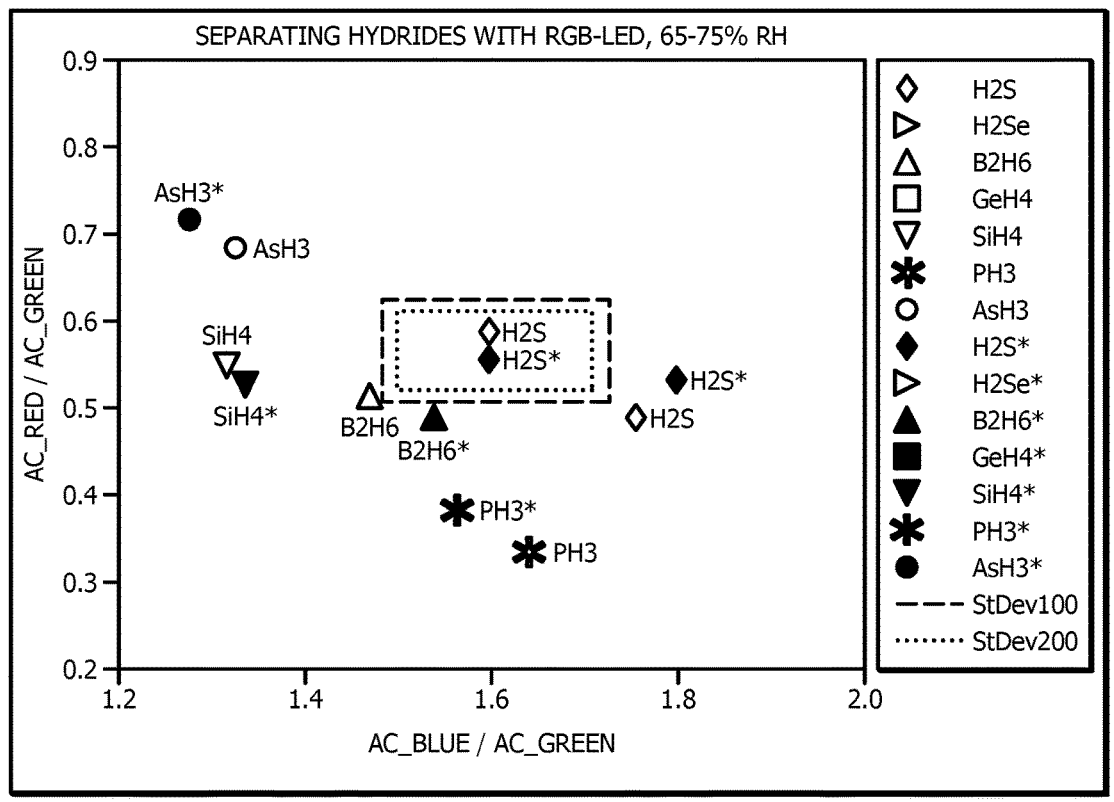
FIG. 11 is a graph of the ratio of AC for red wavelength to the AC for green wavelength versus the ratio of AC for blue wavelength to the AC for green wavelength, for selected gases using a RGB-LED at 65%-75% relative humidity.

Examples 8 to 11 were conducted to demonstrate the pattern recognition technique used for Examples 6 and 7 can be used to distinguish the nuisance gas $H_2S$ from a group of hydride gases, namely, $H_2Se$, $B_2H_6$, $GeH_4$, $SiH_4$, $PH_3$, and $AsH_3$—at different intensities of the wavelengths of light, different relative humidity, and different light sources. Examples 8 and 10 utilized the pattern recognition technique of Example 2. Examples 9 and 11 utilized the pattern recognition technique of Example 3. The system used to generate the data of FIGS. 9 and 11 (Examples 8 and 10) utilized a RGB-LED for the light source. The system used to generate the data of FIGS. 10 and 12 (Examples 9 and 11) utilized an UV+RG-LED for the light source. The gas streams tested for Examples 8 and 9 had a relative humidity of 10%. The gas streams tested for Examples 10 and 11 had a relative humidity of 65%-75%. The same 4× standard deviation used in the previous examples was calculated for Examples 8 to 11.

The results of Examples 8 to 11 are shown in FIGS. 9 to 12, respectively. In the pattern recognition techniques shown in FIGS. 9 and 12, intensities for green wavelength were varied such that AC for green wavelength was 100 and 200 (indicated by * used in the labeling of the gases) for each of the gases tested. AC of 100 for the green wavelength is referred to as green AC=100 below, and AC of 200 for the green wavelength is referred to as green AC=200 below.

Figure 12:
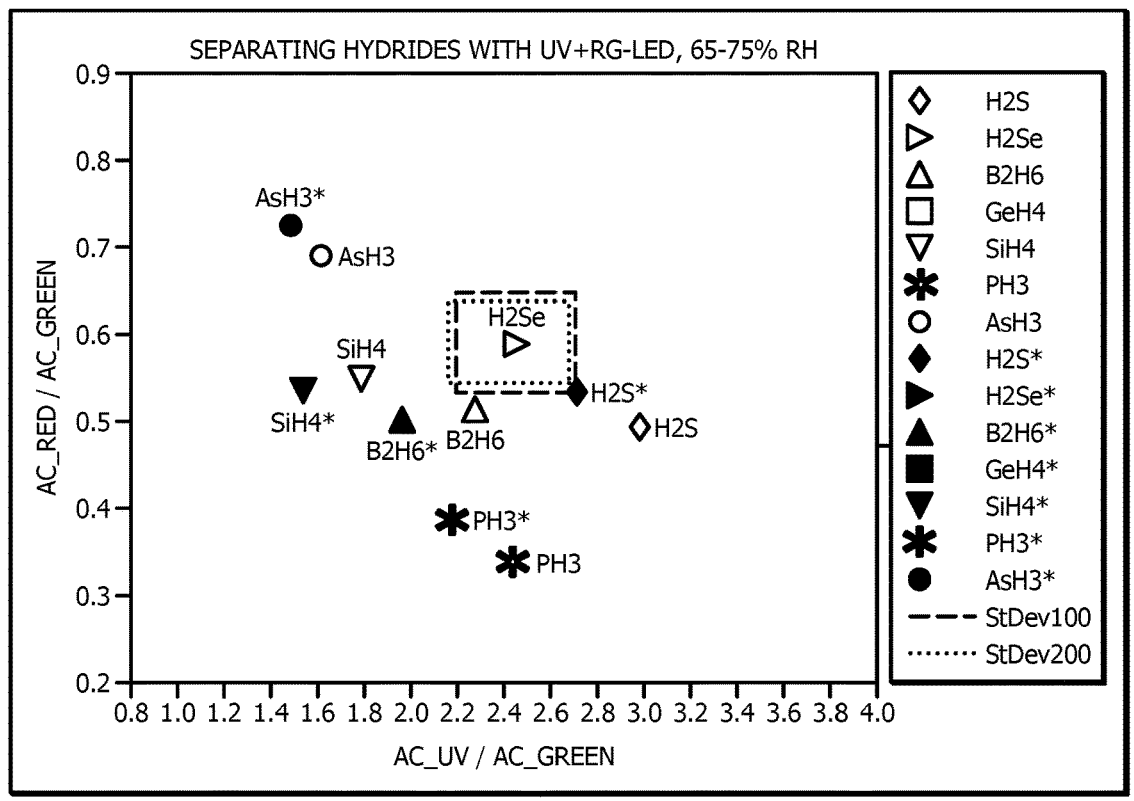
FIG. 12 is a graph of the ratio of AC for red wavelength to the AC for green wavelength versus the ratio of AC for UV wavelength to the AC for green wavelength, for selected gases using a UV+RG-LED at 65%-75% relative humidity.

Without taking into account standard deviation, the values for $H_2S$ in the plots of FIGS. 9 to 12 are distinguishable from the other hydrides tested for all conditions in Examples 8 to 11. When taking into account standard deviation, FIG. 12 shows $H_2Se$ at green AC=100 is not distinguishable from $H_2S$ at green AC=200.

Figure 13:
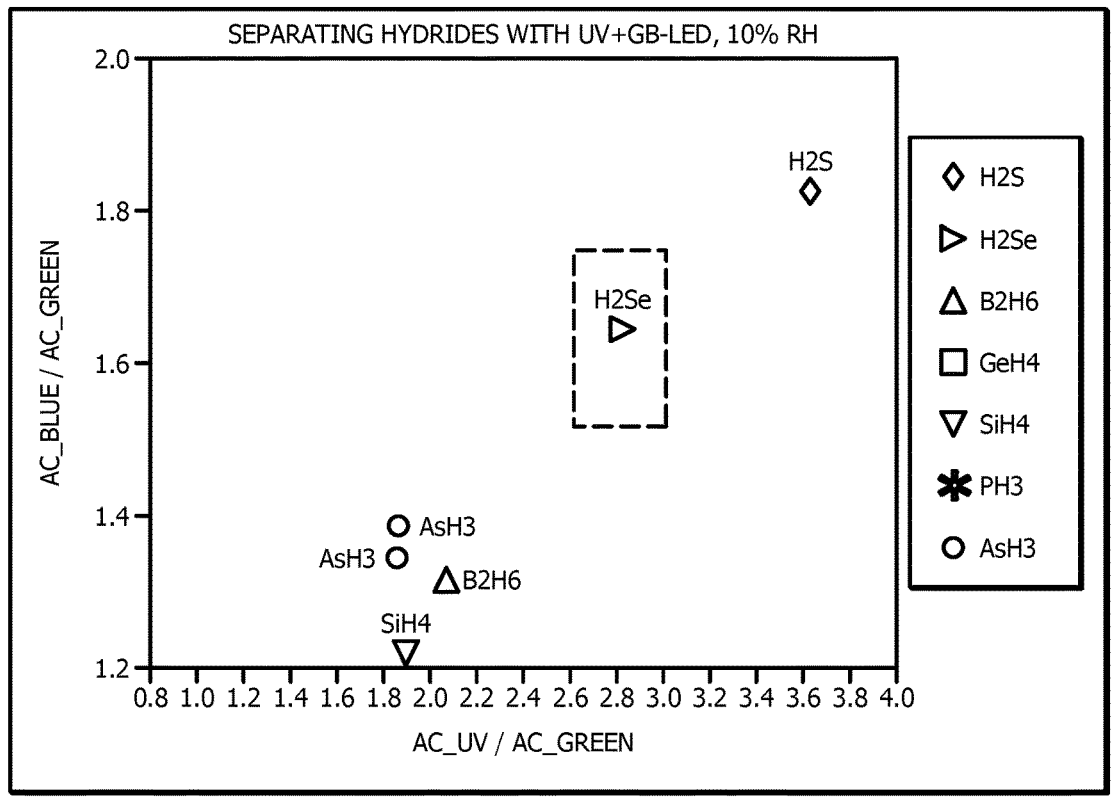
FIG. 13 is a graph of the ratio of AC for blue wavelength to the AC for green wavelength versus the ratio of AC for UV wavelength to the AC for green wavelength, for selected gases using a UV+GB-LED at 10% relative humidity.
Figure 14:
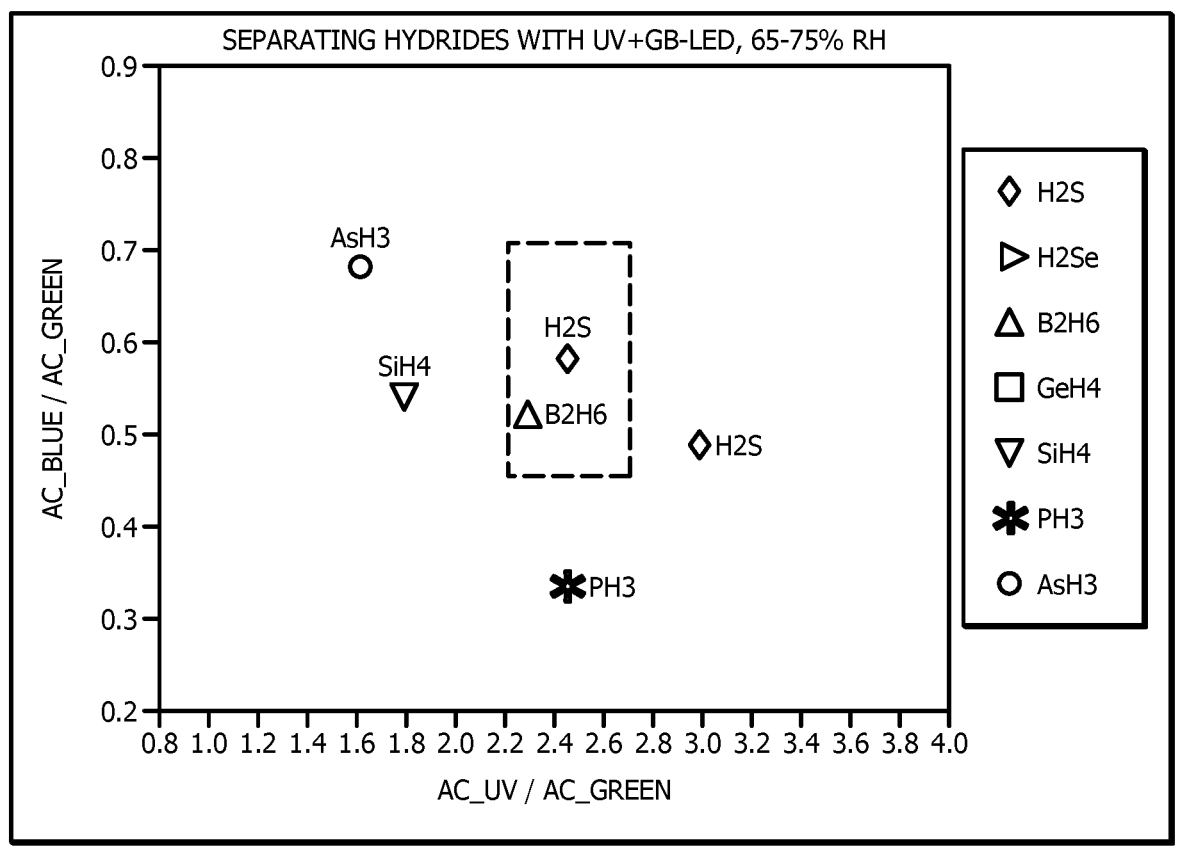
FIG. 14 is a graph of the ratio of AC for blue wavelength to the AC for green wavelength versus the ratio of AC for UV wavelength to the AC for green wavelength, for selected gases using a UV+GB-LED at 65%-75% relative humidity.

Examples 12 and 13 demonstrate another pattern recognition technique which can be used to distinguish $H_2S$ from a group of hydride gases, namely, $H_2Se$, $B_2H_6$, $GeH_4$, $SiH_4$, $PH_3$, and $AsH_3$. The pattern recognition technique in Examples 12 and 13 involved calculating a first ratio of adjusted counts (AC) for blue wavelength to the AC for green wavelength, calculating a second ratio of AC for UV wavelength to the AC for green wavelength, and comparing the first ratio and second ratio to determine any differences between $H_2S$ and the group of hydride gases mentioned above. The AC for green wavelength was 100. The systems used to generate the data of FIGS. 13 and 14 (Examples 12 and 13, respectively) utilized an UV+RG-LED for the light source. The relative humidity of the gas stream used in Example 12 was 10%, and the relative humidity of the gas stream used in Example 13 was 65%-75%. The 4× standard deviation was calculated for $H_2Se$. The results of Examples 12 and 13 are shown in FIGS. 13 and 14. As can be seen, all hydrides are distinguishable from $H_2S$ using the pattern recognition technique. However, most of the hydrides are not distinguishable from one another using the pattern recognition technique.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for distinguishing a nuisance gas from a target gas or group of target gases, the system comprising:
   a paper tape;
   a light source configured to emit at least three wavelengths of light selected from red, green, blue, or ultra-violet wavelength;
   a detector configured to detect a reflected portion for each of the three wavelengths of light which reflects from the paper tape; and
   a processor/controller connected to the detector, the processor/controller configured to:
   generate a reference level to which subsequent data is compared by individually flashing the light source on a fresh paper tape before exposing the paper tape to a gas stream;
   receive a digital signal containing detection information for the reflected portion from the detector;
   calculate, for each light pulse of each wavelength of the at least three wavelengths of light emitted from the light source, an adjusted count based on an original intensity of the light emitted from the light source and an actual intensity of the reflected portion of the light; and
   perform, based on the adjusted count for each light pulse of each wavelength of the at least three wavelengths of light, pattern recognition to determine at least one of a characteristic or a color pattern of the reflected portion for each of the at least three wavelengths of light to distinguish the nuisance gas from the target gas or the group of target gases, wherein a presence of the target gas or the group of target gas warrants an alarm, wherein a presence of the nuisance gas does not warrant the alarm, wherein the nuisance gas is not the target gas or a member of the group of target gases but is detectable by the paper tape, wherein distinguishing the nuisance gas from the target gas or the group of target gases reduces false alarms, and wherein performing pattern recognition includes at least one of:

comparing a first ratio of adjusted counts for red wavelength to adjusted counts for green wavelength and a second ratio of adjusted counts for blue wavelength to the adjusted counts for green wavelength, comparing the first ratio of the adjusted counts for red wavelength to the adjusted counts for green wavelength and a third ratio of adjusted counts for ultra-violet wavelength to the adjusted counts for green wavelength, or comparing the second ratio of the adjusted counts for blue wavelength to the adjusted counts for green wavelength and the third ratio of the adjusted counts for ultra-violet wavelength to the adjusted counts for green wavelength.

2. The system of claim 1, further comprising a datastore operably connected to the processor/controller to record characteristics, color patterns, or both characteristics and color patterns generated by the processor/controller.

3. The system of claim 2, wherein in order to perform pattern recognition, the processor/controller is configured to:

match at least one of the determined characteristic and the determined color pattern with a previously recorded characteristic or a previously recorded color pattern; and identify at least one of the determined characteristic and the determined color pattern as belonging to the nuisance gas, the target gas, or the group of target gases.

4. The system of claim 1, wherein each of the at least three wavelengths is emitted as a separate light pulse.

5. The system of claim 4, wherein the adjusted count for each light pulse of each wavelength of the at least three wavelengths of light emitted from the light source is defined by the following equation:

$$AC=[S(0)/S(t)]-1,$$

wherein $S(0)$ is an original intensity of the light emitted from the light source at time zero and $S(t)$ is an actual intensity of the reflected portion of the light which is detected at time, t, which is greater than 0.

6. The system of claim 1, wherein the at least three wavelengths of light are i) red, green, and blue, ii) ultra-violet, red, and green, iii) ultra-violet, green, and blue, or iv) ultra-violet, red, and blue.

7. The system of claim 1, wherein the controller/processor does not use humidity data to distinguish the nuisance gas from the target gas or the group of target gases.

8. The system of claim 1, wherein the light source includes a UV+GB-LED, a UV+RG-LED, a RGB-LED, or a combination thereof.

* * * * *